Nov. 1, 1955  E. BORNSCHEIN  2,722,098
ESCAPEMENT FOR CLOCKWORKS
Filed Jan. 26, 1953
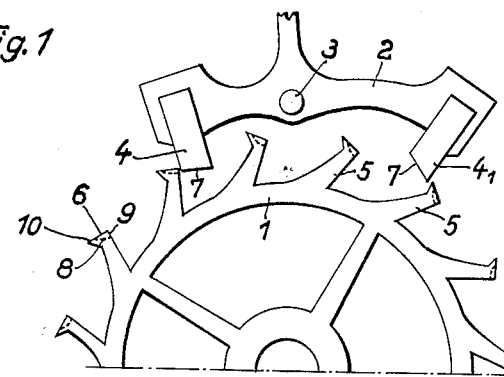
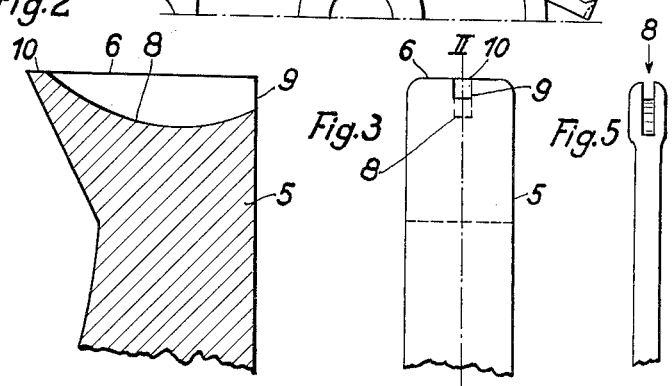
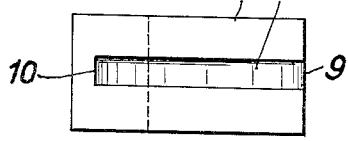
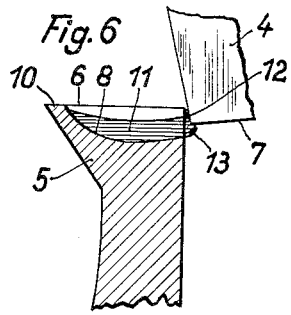
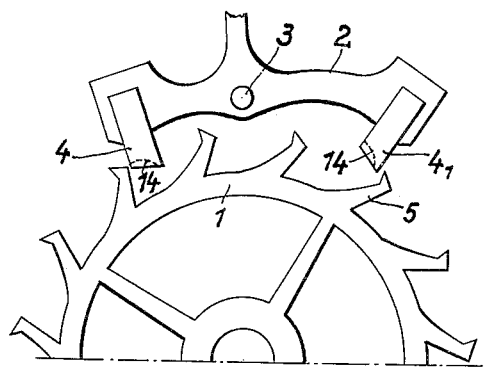
Inventor
Ernst Bornschein
By Frank W. Dahn
Attorneys.

United States Patent Office 2,722,098
Patented Nov. 1, 1955

2,722,098

ESCAPEMENT FOR CLOCKWORKS

Ernst Bornschein, Braunschweig, Germany

Application January 26, 1953, Serial No. 333,293

Claims priority, application Germany January 31, 1952

5 Claims. (Cl. 58—121)

This invention relates to certain improvements in escapements for clockworks.

It is an object of the invention to improve the lubrication of the lifting surfaces of the escapement, i. e., the surfaces where the mutually cooperating elements of the escapement mechanism engage each other, whereby the operation of the escapement mechanism is made more uniform, the time of operation without the necessity of relubricating is increased and the wear and tear is reduced.

A special object of the invention is to provide means ensuring a circulation of the oil applied on these elements and to prevent premature evaporation, oxydation and resinification of the oil.

With these and further objects in view, according to the present invention, grooves or recesses adapted to retain oil are provided in the lifting surfaces of the escapement elements, i. e., either in the lifting surfaces of the teeth of the escape wheel or in the lifting surfaces of the anchor dogs, in such a manner that these recesses are open at the point where the teeth of the escapement wheel come in contact with the anchor dogs, and gradually pass over into the respective lifting surface in the plane of rotation. The width of the recesses is preferably dimensioned so as to ensure a capillary attraction of the oil in the recess.

By this combination of features of the oil-retaining recesses a circulation of the oil is effected in such a way that with each sliding engagement a part of the oil is transmitted to the contact surfaces while the excess of oil is sucked back into the recesses, more particularly by capillary action. This effect is caused by the combination of the flat end of the slots with the opening at the front side thereof.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a fragmentary side view of an escapement or anchor wheel and anchor mechanism having the invention applied thereto, Fig. 2 is a section on line II—II of Fig. 3, showing the upper end of a tooth of the anchor wheel of Fig. 1, on a larger scale, Fig. 3 is a front view of the end of the tooth of Fig. 2, Fig. 4 is a plan view thereof, Fig. 5 is a front view showing a modified form of tooth, and Fig. 6 is a section similar to Fig. 2, showing the points where the anchor teeth engage the anchor dogs, and the narrow wedge-shaped gap between the two lifting surfaces engaging each other, and Fig. 7 is a side view similar to Fig. 1, but with the oil grooves arranged in the lifting surfaces of the anchor dogs.

Similar reference numerals denote similar parts in the different views.

Referring to the drawings in greater detail, it will be seen that the anchor 2, fulcrumed at 3, bears two anchor dogs 4, 4₁ forming the anchor escapement together with the teeth 5 of an anchor wheel 1. The lifting surfaces of the anchor wheel 1 are denoted 6 and those of the dogs 4, 4₁ are denoted 7.

In the embodiment illustrated in Fig. 1, the upper ends of the teeth 5 of the anchor wheel 1 are milled or cut out to form a curved recess or groove, as indicated by the line 8 in Figs. 1–5. As best shown in Figs. 2–4, the recess terminates at the front side of the tooth 5 in an open slot 9, Fig. 3, while gradually passing over into the upper surface 6 of the tooth 5 at the opposite end, at 10.

According to an important feature of the present invention the recess 8 may be made so narrow that the oil is retained therein by capillary attraction. An oil filling of this kind is shown by the line 11 in Fig. 6. Since the anchor wheel is moved intermittently, a small quantity of oil will emerge at the open side 9 of the recess 8 with each retardation by a tooth 5 striking against the anchor dogs 4 or 4₁, but even without this shock effect the oil immediately on engagement of the tooth 5 with one of the dogs 4, 4₁ is drawn by capillary action into a narrow wedge-shaped gap 12 forming between the dogs 4, 4₁ and the front face of each tooth 5. Thus a very small drop of oil 13 will be applied between the dogs 4 or 4₁ and the teeth 5. On further operation the dog 4 or 4₁ will be lifted owing to elastic oscillation of the anchor 2, thereby releasing the engaged tooth 5 for rotation of the wheel 1 through one step. The drop 13 is thereby transferred to the surface 7 of the dog 4 or 4₁ and spread thereon. As the lifting surface 7 slides over the lifting surface 6 of the tooth, excessive oil will be sucked back into the narrow gap 8, so that only a very thin trace of oil is left on the lifting surfaces. This is important since even small quantities of excessive oil tend to oxidize and resinify and in the long run have a retarding rather than a lubricating effect. Owing to the arrangement as hereinbefore described a continuous circulation of oil takes place at the head of the tooth, i. e. the oil emerges from the recess 8 through the front slot 9, gets to the lifting surface 7 of the dogs and through this to the lifting surface 6 of the tooth, whereupon it is sucked back into the slot 8 except for the small portion used for lubrication.

In many instances, the lifting surface of the tooth is much narrower, especially at the front edge, than that shown in Fig. 3. Such narrow surface would be further diminished by the recesses 8 to be provided according to the present invention. Therefore, as shown in Fig. 5, the width of the head of the teeth 5 may be increased by the amount occupied by the recess 8.

By way of alternative, as shown in Fig. 7, the lifting surface 7 of the dogs 4, 4₁ of the anchor 2 may be provided with lubricating recesses 14 which are open at one side. The lubricating process is the same as hereinbefore described.

By the construction according to the present invention it is ensured that the lifting surfaces of the escapement mechanism are satisfactorily lubricated for about the same length of time as the other oiling points. Consequently, the entire clockwork is able to run without attendance for an extended period of time. The oil in the recesses is protected against evaporation, resinification and oxydation and is held together by the capillary action, so that it cannot run out to other parts. Therefore, the clockwork operates more uniformly than without the lubrication according to the present invention.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. An anchor escapement for clockworks, comprising an escapement wheel with teeth having lifting surfaces and an anchor with dogs having counter-lifting surfaces, at least a part of said lifting surfaces including slits which are open at the point where the teeth of the anchor wheel come in contact with the dogs and gradually pass over into the respective lifting surface in the plane of rotation of the escapement wheel.

2. An anchor escapement for clockworks, comprising an escapement wheel with integral teeth having lifting surfaces and an anchor with integral dogs having counter-lifting surfaces, at least a part of said lifting surfaces including slits which are open at the point where the teeth of the anchor wheel come in contact with the dogs and gradually merge into the respective lifting surface in the plane of rotation of the escapement wheel, said recesses being dimensioned so as to retain oil therein by capillary action.

3. An anchor escapement for clockworks, comprising an escapement wheel with teeth having first lifting surfaces and an anchor with dogs having second lifting surfaces for cooperation with the first lifting surfaces, the first lifting surfaces including slits which are open at the point where the teeth of the anchor wheel come in contact with the dogs and gradually pass over into the respective lifting surface in the plane of rotation of the escapement wheel.

4. An anchor escapement for clockworks, comprising an escapement wheel with teeth having first lifting surfaces and an anchor with dogs having second lifting surfaces for cooperation with the first lifting surfaces, the second lifting surfaces including slits which are open at the point where the teeth of the anchor wheel come in contact with the dogs and gradually pass over into the respective lifting surface in the plane of rotation of the escapement wheel.

5. An anchor escapement for clockworks, comprising an escapement wheel with teeth having first lifting surfaces and an anchor with dogs having second lifting surfaces for cooperation with the first lifting surfaces, the first lifting surfaces including recesses which are open at the point where the teeth of the anchor wheel come in contact with the dogs and gradually pass over into the respective lifting surface in the plane of rotation of the escapement wheel, the width of the teeth of the escapement wheel exceeding the width of the wheel itself by the axial width of the recesses.

References Cited in the file of this patent

UNITED STATES PATENTS

| | | |
|---|---|---|
| 280,936 | Lawrence | July 10, 1883 |
| 898,479 | Jeanmairet | Sept. 15, 1908 |

FOREIGN PATENTS

| | | |
|---|---|---|
| 156,800 | Switzerland | Nov. 1, 1932 |
| 215,704 | Switzerland | Jan. 5, 1942 |
| 281,799 | Switzerland | July 1, 1952 |